(12) United States Patent
Kadowaki et al.

(10) Patent No.: US 6,395,342 B1
(45) Date of Patent: May 28, 2002

(54) PROCESS OF PREPARING PELLETS OF SYNTHETIC ORGANIC FIBER REINFORCED POLYOLEFIN

(75) Inventors: Ryosaku Kadowaki; Yasuo Hirano; Toshihiro Asai, all of Kobe (JP)

(73) Assignees: Kabushiki Kaisha Kobe Seiko Sho, Kobe; Toyota Tsusho Corporation, Nagoya, both of (JP)

( * ) Notice: Subject to any disclaimer, the term of this patent is extended or adjusted under 35 U.S.C. 154(b) by 0 days.

(21) Appl. No.: 09/636,459

(22) Filed: Aug. 11, 2000

(30) Foreign Application Priority Data

Aug. 12, 1999 (JP) ..................... 11-228400 PAT

(51) Int. Cl.$^7$ ............... B05D 1/18; D02G 3/00; B32B 27/34
(52) U.S. Cl. ................. 427/434.2; 427/434.6; 427/289; 264/103; 264/171.23; 264/172.11
(58) Field of Search ............. 427/434.2, 434.6, 427/289; 264/103, 171.23, 172.11

(56) References Cited

U.S. PATENT DOCUMENTS

| | | | |
|---|---|---|---|
| 4,486,373 A | | 12/1984 | Kurauchi et al. |
| 4,546,128 A | | 10/1985 | Nakajima |
| 4,876,143 A | | 10/1989 | Sugita et al. |
| 4,944,965 A | * | 7/1990 | Luxon et al. ............ 427/389.7 |
| 5,068,142 A | * | 11/1991 | Nose et al. ............... 428/232 |
| 5,145,892 A | | 9/1992 | Yasukawa et al. |
| 5,268,050 A | * | 12/1993 | Azari ........................ 156/180 |
| 5,433,419 A | * | 7/1995 | Murakami .................. 264/136 |
| 5,520,867 A | * | 5/1996 | Shirai et al. ............... 264/140 |
| 5,935,508 A | * | 8/1999 | Fernyhough et al. ....... 264/495 |
| 6,060,126 A | * | 5/2000 | Saito et al. ............. 427/434.4 |

FOREIGN PATENT DOCUMENTS

| | | |
|---|---|---|
| EP | 0 875 351 | 11/1998 |
| JP | 49-59842 | 6/1974 |
| JP | 50-16736 | 2/1975 |
| JP | 50-67350 | 6/1975 |
| JP | 62-9940 | 1/1987 |
| JP | 62-146945 | 6/1987 |
| JP | 62-146947 | 6/1987 |
| JP | 63-51109 | 3/1988 |
| JP | 1-148515 | 6/1989 |
| JP | 1-167370 | 7/1989 |
| JP | 1-207357 | 8/1989 |
| JP | 1-279974 | 11/1989 |
| JP | 2-124956 | 5/1990 |
| JP | 3-7307 | 1/1991 |
| JP | 3-47714 | 2/1991 |
| JP | 3-290453 | 12/1991 |
| JP | 4-119807 | 4/1992 |
| JP | 4-202545 | 7/1992 |
| JP | 5-169445 | 7/1993 |
| JP | 6-254851 A | * 9/1994 |
| JP | 6-254851 | 9/1994 |
| JP | 6-306216 | 11/1994 |
| JP | 8-150616 | 6/1996 |
| JP | 11-279286 | 10/1999 |

* cited by examiner

Primary Examiner—Michael Barr
(74) Attorney, Agent, or Firm—Oblon, Spivak, McClelland, Maier & Neustadt, P.C.

(57) ABSTRACT

The invention relates to a process of preparing pellets of a synthetic organic fiber reinforced polyolefin and discloses the process in which the reinforcing fiber is impregnated with the molten polyolefin. The invention is characterized in that the sufficient impregnation can be carried out by selecting the polyolefin and the synthetic organic fiber having the appropriate melting points and controlling the temperature of the molten polyolefin to minimize the heat deterioration of the synthetic organic fiber. The pellets obtained by the process of the invention provides a molded product having superior impact resistance and recyclability when used as raw materials for injection molding, injection-compression molding, extrusion, blow molding and a like molding process.

11 Claims, No Drawings

PROCESS OF PREPARING PELLETS OF SYNTHETIC ORGANIC FIBER REINFORCED POLYOLEFIN

BACKGROUND OF THE INVENTION

1. Field of the Invention

The present invention relates to a process of preparing pellets of a synthetic organic fiber reinforced polyolefin, more particularly, to a process of the same which will provide a molded product having superior impact resistance and recyclability when used as raw materials for injection molding, injection-compression molding, extrusion, blow molding and a like molding process. The pellets obtained by the process of the invention can be effectively utilized as molding materials for interior and exterior automotive parts such as a bumper fascia, side maul, battery tray, fan shroud, engine cover, instrument panel, console box, shift lever base, wheel cover and an air spoiler; civil engineering and construction materials such as a concrete panel and a sound barrier; transportation instruments such as a pallet and a container; and furniture items such as a chair and a desk.

2. Description of the Related Art

Polyolefins reinforced with an inorganic filler such as glass fiber or talc for improving heat resistance and rigidity, have the poor impact resistance, particularly at low temperatures. To overcome this disadvantage, there have been proposed a number of molding materials incorporated with a synthetic organic fiber as disclosed in Japanese Examined Patent Publication No.6-25288 and Japanese Unexamined Patent Publications Nos.62-146945, 3-290453, 4-202545 and 6-306216.

In the process of preparing such molding materials, pelletization is carried out by mixing raw materials of a matrix resin and a reinforcing fiber while heating and agitation using a mixer, or melt-mixing, blending or kneading the raw materials using rolls, extruder or a Ko-kneader. The disadvantage of this process is that the reinforcing fiber tends to fracture due to the mechanical mixing, resulting in the poor reinforcing effect.

Another disadvantage of this process is that the synthetic organic fiber used as the reinforcing fiber is deteriorated by heat when the mechanical melt-mixing is carried out at 200° C. or higher. Therefore the resulting molded products exhibit poor impact resistance, particularly at low temperatures.

It is desired to carry out the melt-mixing at relatively low temperature to avoid the heat deterioration. According to an example of Japanese Unexamined Patent Publication No. 3-290453, melt-mixing was carried out at 190° C. Also, Japanese Unexamined Patent Publication No.62-146945 has described that melt-mixing is carried out preferably at 170°–230° C., more preferably at 180–200° C., and in an example thereof the melt-mixing was carried out at 180° C. However, if the melt-mixing is carried out at such a low temperature, the matrix resin still has a high viscosity. Because of the high viscosity, the reinforcing fiber receives a larger load during the melt-mixing process and hence may be undesirably stretched or broken into fiber pieces having shorter lengths. As a result, the sufficient reinforcing effect cannot be obtained.

Japanese Unexamined Patent Publication No.4-202545 discloses a method of providing pellets of a synthetic organic fiber formulated molding materials. In this process, the continuous reinforcing fibers are impregnated with a molten matrix resin and pulled out. The resulting strand therefrom is cut to form pellets. This publication does not describe the retention time of impregnation and only describes the temperature of the molten matrix resin.

In general, the viscosity of a matrix resin needs to be lower for a reinforcing fiber to be sufficiently impregnated with the matrix resin, and for this reason, a process of heating the matrix resin up to a considerably high temperature is typically employed so as to decrease the viscosity thereof. However, a composite material having a mass ratio of an organic fiber to glass fiber mass ratio over 1.9 exhibits remarkably poor impact resistance. Presumably, this is because the organic fiber is exposed to such a high temperature for a prolonged time (i.e., the retention time in the molten matrix resin is long) and hence deteriorated by heat. If the temperature of the molten matrix resin is lowered to avoid such heat deterioration of the organic fiber, the viscosity of the molten resin increase, leading to the decreased productivity and may result in an insufficient impregnation of the fibers with the molten resin. Further, fibers may easily falling off from a pellet thus obtained to form fuzz, which may cause a bridge problem at a hopper in injection molding.

Additionally, Japanese Unexamined Patent Publications Nos.3-7307 and 50-67350 describe methods in which a reinforcing fiber woven fabric is impregnated with a resin to form a sheet and the sheet is cut into pellets. Such methods are economically disadvantageous because numerous steps are required as well as a substantial loss occurs in the cutting process.

There is also known a method of improving the impact resistance by using a long glass fiber as a reinforcing fiber. Though this method somewhat improves the impact resistance at low temperatures, satisfactory improvements cannot obtained as well as a synthetic organic fiber. This is because a glass fiber tends to fracture than a synthetic organic fiber. In the case of recycling the molded product, breaking the glass fiber is inevitable in a re-molding process, hence a fiber length enough for the sufficient reinforcement cannot maintained. Therefore, the resulting recycled products will show the poor impact resistance.

In addition, the recycling process requires cutting or breaking of the molded products into pellets, and such a cutting or breaking operation causes glass fiber to fracture and scatter into the working atmosphere thereby making the working environment worse, for example, operators come to feel prickled.

The invention has been made in view of the foregoing problems residing in the prior art.

SUMMARY OF THE INVENTION

The present invention is directed to a process for preparing pellets of a synthetic organic fiber reinforced polyolefin, comprising:

heating a polyolefin at the temperature which is higher than the melting point thereof by 40° C. or more to lower than the melting point of a synthetic organic fiber to form a molten polyolefin;

passing a reinforcing fiber comprising the synthetic organic fiber continuously through the molten polyolefin within six seconds to form a polyolefin impregnated fiber; and cutting the polyolefin impregnated fiber into the pellets. wherein the synthetic organic fiber has the melting point in the range of over 200° C. to 265° C.

The foregoing and other objects, features and attendant advantages of the present invention will be more fully appreciated from the reading of the following detailed description.

DESCRIPTION OF THE PREFERRED EMBODIMENT

In the present invention, pellets of a synthetic organic fiber reinforced polyolefin are prepared from a reinforcing fiber comprising a synthetic organic fiber and a polyolefin as a matrix resin by the process of melt pultrusion process. In this process, the reinforcing fiber is impregnated with the molten polyolefin while the reinforcing fiber is passing continuously through the molten polyolefin and then the resulting polyolefin impregnated fiber is cut into the pellets.

First of all, raw materials used in the invention is described.

I. Reinforcing Fiber

The reinforcing fiber preferably has the form of a roving (a bundle of long filaments). It is recommended that each filament should have a diameter ranging between 0.5 $\mu$m and 100 $\mu$m, more preferably between 1.0 $\mu$m and 50 $\mu$m. For improvements in impact resistance, it is effective to use a fiber having a strength of not less than 3.55 cN/dtex (4 g/denier), preferably not less than 5.33 cN/dtex (6 g/denier).

The reinforcing fiber is preferably used in a pellet in an amount of 10 mass % to 50 mass %, preferably 15 mass % to 40 mass %. When the amount is smaller than 10 mass %, the resulting impact resistance is not sufficient. When the amount is larger than 50 mass %, the reinforcing fiber is poorly impregnated with the polyolefin, the moldability becomes worse, and the resulting molded product has a degraded surface appearance.

The reinforcing fiber comprises a synthetic organic fiber whose melting point is over 200° C. to 265° C.

Typically, solid synthetic organic fibers are used in the invention. Hollow fibers having a circular or rectangular hollow portions therethrough may be used for reducing a weight of the fibers as required.

Depending on the performance required, it is possible to use a recycled synthetic organic fiber produced from recycled PET bottles or the like, or a synthetic organic fiber of the core shell type or bicomponent type comprising plural sorts of polymers. Also, the synthetic organic fiber may contain appropriate amounts of an inorganic filler such as talc or calcium carbonate, a coloring agent such as a pigment, a flame-retardant, a light stabilizer and the like.

Examples of preferred synthetic organic fibers, in view of price and balance of mechanical properties, include polyethylene terephthalate fibers (melting point: about 255° C.), polybutylene terephthalate fibers (melting point: about 230° C.), polyamide 6 fibers (melting point: about 215° C.), and polyamide 66 fibers (melting point: about 260° C.). Polyethylene terephthalate fibers, polyamide 6 fibers and polyamide 66 fibers are more preferably among them, because they have a good heat aging resistance and give the heat-resistance to the resulting molded products therefrom in view of recycle use. The synthetic organic fiber may be used alone or in combination with another sort of the fiber.

The reinforcing fiber may further contain a synthetic organic fiber which is plated or coated with a metal, or a metal fiber as well as the general-purpose synthetic organic fiber without any surface treatment, thereby providing the resulting pellet exhibiting the enhanced mechanical properties by the metal coating layer and superior electromagnetic wave shielding properties. Example of a metal fiber includes a metal fiber prepared from SUS, nickel-titanium alloy or copper.

II. Polyolefin

The polyolefin, which is used as a matrix component, has no limitation on its type. Preferable examples of the polyolefin, in view of physical properties and price, are a polypropylene (PP); a high-density polyethylene (HDPE); a linear low-density polyethylene (LLDPE); a low-density polyethylene (LDPE); a polymer or a copolymer of $\alpha$-olefins such as butene-1, hexene-1 and octene-1; a modified polyolefin which is modified with unsaturated carboxylic acids or their derivatives; and blends of two or more of them. Examples of the unsaturated carboxylic acids or their derivatives for use in the modification are acrylic acid, methacrylic acid, maleic acid, itaconic acid, fumaric acid or esters of these acids, maleic anhydride, and itaconic anhydride. Maleic anhydride and glycidyl methacrylate are particularly preferable.

The modified polyolefin has the reactivity to the synthetic organic fiber and also the good adhesion to the polyolefin. Therefore the modified polyolefin is preferably used to improve the interface strength between the synthetic organic fiber and the polyolefin, thus the resulting pellets enhance the mechanical properties of the molded product therefrom. The modified polyolefin is preferably added in an amount of 0.1 mass % to 15.0 mass % based on the amount of the polyolefin, more preferably 0.2 mass % to 12.0 mass %, most preferably 0.5 mass % to 10.0 mass %.

The choice of the modified polyolefin is dependent on the type of the synthetic organic fiber. The preferable choices are maleic anhydride-modified polyolefins in the case of polyamide fibers, and oxazoline-modified polyolefins, glycidyl methacrylate ester-modified polyolefins and maleic anhydride-modified polyolefins in the case of polyester fibers.

The polyolefin may be used with an inorganic filler. It is possible to disperse an appropriate amount of an inorganic filler in the molten polyolefin so that the synthetic organic fiber is impregnated with the polyolefin together with the inorganic filler. The inorganic filler is preferably a powdery inorganic filler, and examples of the inorganic filler are talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, and zinc sulfide. The inorganic filler may be used individually or as a mixture of two or more.

Talc, clay, mica and wollastonite are particularly preferable among these inorganic fillers in view of price and physical property providing the higher rigidity without degrading the impact resistance. Of these, talc is most preferable. The talc preferably has the average particle diameter ranging from 0.5 $\mu$m to 15.0 $\mu$m, more preferably from 1.0 $\mu$m to 5.0 $\mu$m.

The inorganic filler is preferably used in an amount of 5.0 mass % to 30 mass % with respect to the polyolefin. The amount of the inorganic filler is dependent on the physical properties required by an intended molded product. When the amount of the inorganic filler is smaller than 5.0 mass %, the filler provides insufficient improvements in rigidity and heat resistance. When the amount of the filler is larger than 30.0 mass %, the moldability becomes low. To ensure the sufficient moldability, the amount of the synthetic organic fiber must be decreased, thereby resulting in the poor impact resistance.

The polyolefin may further contain a dispersant, a lubricant, a flame-retardant, an antioxidant, an antistatic agent, a light stabilizer, a ultraviolet light absorber, a carbon black, a crystallization accelerator (nucleating agent), a plasticizer and a coloring agent such as dye or pigment.

III. Heating and Melting of Polyolefin

According to the invention, the polyolefin is heated and melted in a bath at the temperature which is higher than the melting point thereof by 40° C. or more to lower than the melting point of the synthetic organic fiber to form a molten polyolefin.

When the polyolefin is not heated at the temperature which is higher than the melting point thereof by 40° C. or more, the sufficient impregnation of the synthetic organic fiber with the polyolefin cannot be attained due to the high viscosity of the molten polyolefin. This may lead to a defective product. For this reason, the temperature of the molten polyolefin is preferably set in the range higher than the melting point of the polyolefin by 40° C. or more, more preferably 60° C. or more. However, when the temperature of the molten polyolefin is raised higher than the melting point of the synthetic organic fiber, the synthetic organic fiber is melted and hence does not serve as the reinforcing fiber. Thus, the temperature of the molten polyolefin is preferably set lower than the melting point of the synthetic organic fiber. To minimize the heat-deterioration of the synthetic organic fiber during the impregnation process, it is desired that the temperature of the molten polyolefin is set in the range lower than the melting point of the synthetic organic fiber by 5° C. or more, preferably 10° C. or more.

The polyolefin is preferably selected so as to have a melt viscosity suitable for ensuring the sufficient impregnation of the reinforcing fiber with the polyolefin resin.

For example, in the case of a polypropylene, the polypropylene preferably has a melt flow rate (hereinafter referred to as MFR) ranging between 10 g/10 min. and 200 g/10 min., more preferably between 30 g/10 min. and 150 g/10 min., most preferably between 40 g/10 min. and 100 g/10 min. in the condition of 230° C. and 2.16 kgf.

When MFR of the polypropylene is less than the above range, the productivity of pellets containing long fibers tends to lower. Even if such pellets can be manufactured, the pellets allow the reinforcing fiber to fall off easily due to the poor impregnation with the polypropylene, resulting in a handling problem, and the mechanical properties of the molded product tend to vary due to the insufficient dispersion of the reinforcing fiber. When MFR exceeds the above proper range, performance of the polypropylene such as strength, modulus, creep resistance, fatigue resistance and heat resistance becomes low, resulting in the low performance of the molded products, especially the lower heat resistance.

IV. Melting Points between Polyolefin and Synthetic Organic Fiber

In addition to heating the polyolefin to form a molten polyolefin, the relation of the melting points of the synthetic organic fiber and the polyolefin is also important in the invention.

The synthetic organic fiber preferably has the melting point over 200° C., preferably higher than 210° C. to 265° C. and also preferably has the melting point higher than the polyolefin by 50° C. or more. If the melting point of the synthetic organic fiber($Tm_f$) is not higher than that of the polyolefin($Tm_p$) by 50° C., namely $Tm_f-Tm_p<50°$ C., it is difficult for the synthetic organic fiber to be impregnated with the polyolefin sufficiently without heat deterioration since the melting point of the polyolefin is too close to that of the synthetic organic fiber.

In the case of too close melting points, the melt viscosity of the polyolefin is too high to impregnate the synthetic organic fiber sufficiently. On the other hand, in the case that the polyolefin is heated so as to have a melt viscosity allowing the easy impregnation of the synthetic organic fiber, the synthetic organic fiber is deteriorated by heat, thus resulting in the poor reinforcing effect.

When the synthetic organic fiber whose melting point is not higher than 200° C. is used, the temperature of the molten polyolefin must be set lower than the melting point of the synthetic organic fiber and the molten polyolefin has higher viscosity, resulting in the insufficient impregnation with the molten polyolefin. The resulting pellets therefrom permit the synthetic organic fiber to fall off easily, thus leading to a trouble during molding.

When the synthetic organic fiber whose melting point is higher than 265° C. is used, the temperature of the molten polyolefin can be raised to have such a low viscosity as to allow the sufficient impregnation of the synthetic organic fiber with the molten polyolefin without heat deterioration. Thus, the pellets with excellent performance can be obtained without using the process of the invention. However, since the synthetic organic fibers which have such a high melting point (high heat resistance) are too expensive, they are unfit for the application area of the invention in which a general-purpose polyolefin resin is used.

Accordingly, for the sufficient impregnation of the synthetic organic fiber with the polyolefin without any heat deterioration, the polyolefin should be selected so that the melting point of a synthetic organic fiber is higher than that of the polyolefin by 50° C. or more, preferably 60° C. or more, namely $Tm_f-Tm_p>50°$ C., preferably $Tm_f-Tm_p>60°$ C.

As described above, the invention is characterized in that the sufficient impregnation can be carried out by selecting the polyolefin and the synthetic organic fiber having the appropriate melting points and controlling the temperature of the molten polyolefin to minimize the heat deterioration of the synthetic organic fiber.

V. Impregnation of Reinforcing fiber

The reinforcing fiber comprising the synthetic organic fiber is subjected to passing continuously through the molten polyolefin in a bath within six seconds, thereby being impregnated with the polyolefin to form a polyolefin impregnated fiber. Concretely, the reinforcing fiber is spread like a band while passing continuously through the molten polyolefin heated at the proper temperature, assembled in the molten polyolefin and then pulled out of the molten polyolefin in the bath through nozzles to form a polyolefin impregnated fiber. Pulling speed of the reinforcing fiber through the molten polyolefin in the bath is preferably controlled so as to avoid the heat deterioration of the reinforcing fiber. To minimize the heat deterioration and maintain the reinforcing effect, the reinforcing fiber is passing continuously through the molten polyolefin within six seconds, preferably four seconds, more preferably three seconds. In other words, passing time that the reinforcing fiber is kept in the molten polyolefin should be within six seconds. If passing time exceeds six seconds, the heat deterioration of the reinforcing fiber proceeds. However, the passing time is preferable at least 0.2 seconds, more preferably over 0.5 seconds to ensure the sufficient impregnation.

The reinforcing fiber is preferably twisted while passing through the molten polyolefin in the bath as in the process described in Japanese Unexamined Patent Publication No. 5-169445. The reinforcing fiber is preferably twisted so as to promote the impregnation of the reinforcing fiber with the molten polyolefin, thereby providing a pellet in a good impregnation condition. When the reinforcing fiber has been partially broken, the broken fiber is wound into the reinforcing fiber while twisting, and pulled out with the reinforcing fiber as in the natural fiber twisting process which twists discontinuous natural fiber into a continuous thread. Therefore, the production of the pellets becomes stable and efficient without a trouble that the production is forced to stop due to the complete break of the continuous fiber. In addition, twisting makes the reinforcing fiber in a pellet somewhat longer than the length of the pellet. The longer length of the reinforcing fiber in a pellet contributes to enhance the mechanical properties of the reinforced polyolefin and also gives an advantage in handling the pellets. Because the pellets having a longer length corresponding to a longer fiber usually tend to cause a bridge problem at a hopper in molding.

As described above, the reinforcing fiber is impregnated with the molten polyolefin to form a polyolefin impregnated fiber. The polyolefin impregnated fiber is cooled and cut in a predetermined length to produce pellets of a synthetic organic fiber reinforced polyolefin.

VI. Pellets

The pellets preferably have the length in the range of 2.0 mm to 24.0 mm. A pellet having a length of less than 2.0 mm does not provide sufficient mechanical properties, while a pellet having a length of more than 24.0 mm is likely to cause a bridge problem at a hopper in molding, thereby hindering smooth molding. The pellets have more preferably the length in the range of 3.0 mm to 15.0 mm, most preferably 3.0 mm to 12.0 mm. The pellets have the diameter in the range of 1.0 mm to 4.0 mm, preferably 2.0 mm to 3.0 mm in view of productivity and handling. The pellets has a ratio of the length (L) to the diameter (D)(hereinafter L/D) in the range of 1 to 6. When the ratio of L/D is less than 1, a crack is likely to occur in the cutting process, and fuzzing of the reinforcing fiber tends to occur, thereby making the handling worse. On the other hand, when the ratio of L/D value is more than 6, the pellets become so long as to cause the low productivity. In addition, the long pellets are likely to be broken and the length of the reinforcing fiber becomes short when, for example, the long pellets are taken in by screws in injection molding. The sufficient mechanical properties cannot be obtained due to the short reinforcing fiber. From such a standpoint, a preferable L/D value is within the range from 2 to 4.

The pellets thus obtained is melted for molding at the temperature over the melting point of the polyolefin and preferably lower than 200° C. The resulting molded products having excellent impact resistance can be obtained.

EXAMPLE

The present invention will be more specifically described by way of examples and comparative examples. The examples described below are not limitative of the invention and variations and modifications in the light of the foregoing and the following descriptions are included in the scope of the invention.

In the following examples and the claims as well as the foregoing description, the melting point (softening point) of each raw material is determined as a peak value of a curve obtained by a differential scanning calorimeter (DSC) according to JIS K7121.

I Preparation of an Synthetic Fiber Reinforced Polyolefin

Raw materials for examples are listed below.

Component A is a polyolefin in a pellet form.

A-1: A polypropylene polymer having a MFR (230° C., 2.16 kgf) of 60 g/10 min and a melting point of 165° C. and composed of only a crystalline polypropylene component having a density of 0.909 g/cm$^3$;

A-2: A propylene-ethylene block copolymer having a total MFR (230° C., 2.16 kgf) of 40 g/10 min and a melting point of 164° C. and composed of 90 mass % of a crystalline polypropylene component (X unit) having a density of 0.909 g/cm$^3$ and 10 mass % of a propylene-ethylene random copolymer component (Y unit) containing 39 mass % of ethylene. The content of the Y unit component was determined by calculating backward from a mass found by dipping 2 g of a sample in 300 g of boiled xylene for 20 minutes to dissolve the sample therein, cooling the solution to room temperature, filtering the solution with a glass filter to obtain a deposited solid phase and drying the solid phase thus obtained.

Component B is a modified polyolefin in a pellet form or a pulverized form.

A maleic anhydride-modified propylene polymer (trade name: YUMEX 1001, a product of SANYO KASEI KOGYO CO.), having acid value: 26 mgKOH/g, density: 0.95 g/cm$^3$, molecular weight: 40,000 (mass-average molecular weight determined by GPC), melt viscosity: 16 Pa·s (16,000 cps) (160° C.), and melting point: 150° C.

Component C is a reinforcing fiber comprising a synthetic organic fiber in the form of roving.

C-1: a polyethylene terephthalate fiber (melting point: 255° C.), a roving of 300 filaments each having a diameter of 15 $\mu$m (strength: 5.33 cN/dtex);

C-2: a polyamide 66 fiber (melting point: 260° C.), a roving of 50 filaments each having a diameter of 20 $\mu$m (strength: 6.22 cN/dtex).

Component D is a filler in the form powder.

Talc: fine particles of talc having an average particle diameter of 1.8 $\mu$m (trade name: HIGH FILLER #5000PJ, a product of MATSUMURA SANGYO CO.)

A polyolefin(Component A), a modified polyolefin (Component B) and a filler(Component D) were formulated, melted an extruded by an extruder to form a melt bath in accordance with the formulation of Table 1. A reinforcing fiber comprising a synthetic organic fiber(Component C) was passed continuously through the molten polyolefin to form a polyolefin impregnated fiber while twisting. The passing time was also shown in Table 1. The polyolefin impregnated fiber was cut into pellets with the diameter of 3 mm and the length of 8 mm.

TABLE 1

| Ingredients | | MP (° C.) | Ex 1 | Ex 2 | Ex 3 | Ex 4 | Ex 5 | Ex 6 | Ex 7 | Com. Ex 1 | Com. Ex 2 | Com. Ex 3 | Com. Ex 4 |
|---|---|---|---|---|---|---|---|---|---|---|---|---|---|
| Polyolefin | A-1 | 165 | 70 | 70 | 68 | — | — | 48 | 70 | 70 | 70 | 70 | — |
|  | A-2 | 164 | — | — | — | 58 | 68 | — | — | — | — | — | 70 |
| Modified Polyolefin | B | 150 | — | — | 2 | 2 | 2 | 2 | — | — | — | — | — |
| Reinforcing Fiber | C-1 | 255 | 30 | 30 | 30 | 30 | 20 | 30 | — | 30 | 30 | 30 | 30 |
|  | C-2 | 260 | — | — | — | — | — | — | 30 | — | — | — | — |
| Filler | D | — | — | — | — | 10 | 10 | 20 | — | — | — | — | — |
| Melt Bath Temp | | (° C.) | 230 | 250 | 250 | 230 | 250 | 250 | 210 | 200 | 270 | 220 | 230 |

TABLE 1-continued

| Ingredients | | MP (° C.) | Ex 1 | Ex 2 | Ex 3 | Ex 4 | Ex 5 | Ex 6 | Ex 7 | Com. Ex 1 | Com. Ex 2 | Com. Ex 3 | Com. Ex 4 |
|---|---|---|---|---|---|---|---|---|---|---|---|---|---|
| Passing Time | (sec.) | — | 3 | 0.4 | 1 | 6 | 1.5 | 2 | 6 | 20 | 0.5 | 10 | 8 |
| Productivity | | — | good | good | good | good | good | good | good | NG*1) | NG*2) | good | good |

Formulation unit: parts
NG* 1)insufficient impregnation of the reinforcing fiber
NG *2)Break of the reinforcing fiber As shown in table 1, Examples 1 to 7, which satisfied all the requirements of the invention, provided pellets which is homogeneously impregnated with the polyolefin and completely free from fiber break and fuzzing and excellent in moldability. Regarding Comparative Example 1, the reinforcing fiber was not impregnated enough with the polyolefin even the passing time was extended. In Comparative Example 2, the break of the reinforcing fiber occurred due to the higher temperature of the molten polyolefin, even passing through the molten polyolefin within the short seconds.

II Molding and Evaluation of the Molded Products
1. Molding

The pellets obtained above was subjected to molding. An injection molding machine(trade name: JSW J200SA, manufactured by NIPPON SEIKOSHO Co.) was used and the mold temperature was set at 60° C. for molding the pellets. The pellets were heated at 200 ° C. and molded into test pieces according to JIS to measure the mechanical properties. The results was shown in Table 2. As a reference example, the pellets obtained in example 1 prepared by the process of the invention were also heated at 230° C. and molded. The result of the reference example was also shown in Table 2.

2. Method of Evaluation

Bending strength and Bending modulus were measured according to JIS K7203 (temperature: 23° C.). Izod impact strength (notched) was measured according to JIS K7110 (temperature: 23° C. and −30° C.).

TABLE 2

| | Bending | | Izod Impact | |
|---|---|---|---|---|
| | Strength | Modulus | Notched (KJ/m$^2$) | |
| Sample | (MPa) | (MPa) | 23(° C.) | −30(° C.) |
| Ex 1 | 41.2 | 2048 | 49 | 44 |
| Ex 2 | 40.2 | 2058 | 48 | 41 |
| Ex 3 | 42.1 | 2087 | 59 | 49 |
| Ex 4 | 42.1 | 2244 | 56 | 45 |
| Ex 5 | 39.2 | 2029 | 44 | 38 |
| Ex 6 | 41.2 | 2979 | 49 | 42 |
| Ex 7 | 39.2 | 1842 | 47 | 40 |
| Ref. Ex. | 40.2 | 2019 | 19 | 19 |
| Com. Ex 3 | 40.2 | 2029 | 30 | 24 |
| Com. Ex 4 | 41.2 | 2019 | 47 | 22 |

As shown in Table 2, all the examples 1 to 7 showed the excellent mechanical properties. The comparative examples 3 and 4 showed the poor Izod impact strength especially at low temperature. This is because the synthetic organic fiber was heat deteriorated by exceeding the passing time of six seconds. The reference example showed the poor mechanical properties, especially for impact strength both at normal and low temperature, in spite of the pellets prepared by the process of the invention. This is because the heat deterioration occurred due to the high molding temperature of 230° C. Therefore, the molding temperature is also important for making the best use of the performance of the pellets obtained by the invention. Thus, it is desired that the temperature for molding or for recycling should be lower than the melting point of the reinforcing fiber, preferably by about 40° C. or more, more preferably by about 50° C. or more.

What is claimed is:

1. A process for preparing pellets of a synthetic organic fiber reinforced polyolefin, comprising heating a polyolefin at the temperature which is higher than the melting point thereof by 40° C. or more to lower than the melting point of a synthetic organic fiber to form a molten polyolefin;

passing a reinforcing fiber comprising the synthetic organic fiber continuously through the molten polyolefin so that the passing time for the reinforcing fiber to be kept in the molten polyolefin is within six seconds to form a polyolefin impregnated fiber; and cutting the polyolefin impregnated fiber into the pellets, wherein the synthetic organic fiber has the melting point in the range of over 200° C. to 265° C.

2. The process according to claim 1, wherein the reinforcing fiber comprising the synthetic organic fiber is twisted while passing through the molten polyolefin.

3. The process according to claim 1, wherein the polyolefin is heated at the temperature higher than the melting point of the polyolefin by 60° C. or more.

4. The process according to claim 1, wherein the reinforcing fiber further comprises the synthetic organic fiber which is plated or coated with a metal.

5. The process according to claim 1, wherein the reinforcing fiber further comprises a metal fiber.

6. The process according to claim 1, wherein the synthetic organic fiber is at least one selected from the group consisting of a polyethylene terephthalate fiber, a polyamide 6 fiber, and a polyamide 66 fiber.

7. The process according to claim 1, wherein the passing time is within three seconds.

8. The process according to claim 1, wherein the polyolefin is polypropylene.

9. The process according to claim 1, wherein the pellet contains 10 to 50 mass % of the reinforcing fiber comprising the synthetic organic fiber.

10. The process according to claim 1, wherein the pellet has a length of 2 to 24 mm and a diameter of 1 to 4 mm.

11. The process according to claim 10, wherein the pellet has a ratio of the length to the diameter ranging from 1 to 6.

* * * * *